(12) United States Patent
Dolezal

(10) Patent No.: US 12,182,268 B2
(45) Date of Patent: Dec. 31, 2024

(54) DEVICE SELF-MITIGATION OF ELECTRICAL TRANSIENTS

(71) Applicant: NCR Voyix Corporation, Atlanta, GA (US)

(72) Inventor: Robert Michael Dolezal, Buford, GA (US)

(73) Assignee: NCR Voyix Corporation, Atlanta, GA (US)

( * ) Notice: Subject to any disclaimer, the term of this patent is extended or adjusted under 35 U.S.C. 154(b) by 202 days.

(21) Appl. No.: 17/899,941

(22) Filed: Aug. 31, 2022

(65) Prior Publication Data
US 2024/0070281 A1 Feb. 29, 2024

(51) Int. Cl.
*G06F 21/57* (2013.01)
*G06F 9/4401* (2018.01)

(52) U.S. Cl.
CPC .......... *G06F 21/572* (2013.01); *G06F 9/4401* (2013.01); *G06F 21/575* (2013.01)

(58) Field of Classification Search
CPC .............................. G06F 9/4401; G06F 13/575
USPC .......................................................... 713/2
See application file for complete search history.

(56) References Cited

U.S. PATENT DOCUMENTS

| | | | | |
|---|---|---|---|---|
| 5,978,195 | A * | 11/1999 | Goder | H02H 7/1227 361/86 |
| 10,255,603 | B1 * | 4/2019 | Rezayee | G06Q 20/3829 |
| 2017/0371388 | A1 * | 12/2017 | Lu | H04L 9/3242 |
| 2019/0065751 | A1 * | 2/2019 | Srinivas | G06F 21/575 |
| 2022/0188147 | A1 * | 6/2022 | Nudelman | G06F 9/485 |
| 2023/0297360 | A1 * | 9/2023 | Sethi | G06F 8/65 717/168 |

* cited by examiner

*Primary Examiner* — Brian T Misiura
(74) *Attorney, Agent, or Firm* — Schwegman Lundberg & Woessner, P.A.

(57) ABSTRACT

During startup or boot of a device, software or firmware associated with a processor and/or microcontroller of the device slow walks the handover of control to critical initialization or steady-state functions to account for any instability due to an electrical transient that may cause the processor and/or microcontroller to perform erratically or non-deterministically during startup or boot. The wait time associated with the slow-walk handover of control is optimized to ensure that no instability due to transients is present when the wait time expires. In an embodiment, after the wait time expires, firmware/software associated with the bootloader and/or Basic Input/Output System (BIOS) may further continuously calculate a checksum value for the corresponding target software/firmware and compare the calculated value against an expected checksum value. When the calculated checksum matches the expected checksum, remaining portions of the firmware/software for the bootloader and/or BIOS are given control.

17 Claims, 6 Drawing Sheets

DEVICE SELF-MITIGATION OF ELECTRICAL TRANSIENTS

BACKGROUND

Electrical transients, which can occur any time that a device is operating, and which may be particular likely to occur when power is first applied to a device, can impair the operation of electrical components such as microcontrollers and other processors, potentially causing them to behave erratically.

Transients are momentary increases or decreases in voltage or current that can occur at any time due to noise in an electrical connection that powers a device and may be induced when the device is powered on or during steady-state operation of the device. Transients may originate within a device itself or originate elsewhere and travel to a device as electromagnetic transients through space, over the air, or via electrical/communication lines. Transients may be associated with high voltages that drive a large amount of current through an electrical circuit associated with a device. Even the best circuit designs typically cannot entirely eliminate the possibility of disruptive transients. When transients occur, they may disrupt the proper operation of electrical and electronic components, causing erratic behavior, unexpected behavior, as well as, potentially other undesirable outcomes.

For example, a microcontroller typically executes a bootloader block of code as a first step in initializing a device. If the bootloader's first tasks include hardware initialization or validation of application firmware before the bootloader transfers control to the application firmware, then an erratically behaving microcontroller may not be able to initialize the hardware correctly or transfer control to the application firmware. The device will be functionally impaired in such cases.

Often while a device is operating, lightning can cause a power surge that will force the device into a reboot or restart. The user may detect erratic behavior and attempt to power the device off and on. When the device is powered back on, the transient may still be present if the user did not wait for a sufficient amount of time before restarting the device or if the device automatically restarts itself following the surge.

SUMMARY

In various embodiments, methods and a system for device self-mitigation of electrical transients are presented. On device startup, firmware is executed that slows loading of the usual boot loader, application firmware, Basic Input/Output System (BIOS), and/or other software, which serves to mitigate against erratic microcontroller or processor behavior that may be experienced during startup as a result of an electrical transient. During the slowed startup, a nested loop is executed a preconfigured number of times. An innermost loop of the nested loop may execute no-operation (no-op) instructions or the equivalent a first number of times, and upon completion, control may revert back to an outer loop of the nested loop in which the innermost loop is contained. The outer loop may then return control to the innermost loop, such that the no-op instructions are again executed the first number of times. This may continue iteratively until the outer loop exits after a specified number of iterations. A similar process may occur at each level of nesting. For instance, if the above-referenced outer loop (e.g., first outer loop) is itself a nested loop contained within a second outer loop, then the second outer loop may continue to revert control back to the first outer loop until the second outer loop exits after some specified number of iterations.

In an embodiment, firmware associated with the bootloader, the BIOS, and/or other early-executing software may include additional looping instructions that calculate a checksum for the application firmware or other target software against an expected checksum value, such that when the expected checksum value matches the calculated checksum value, control is given to the target software.

According to an aspect, a method for device self-mitigation of electrical transients is presented. A startup process is delayed on a device and a portion of the startup process is delayed from handing over control to the target software by processing delaying instructions to account for any potential electrical transient present on the device. After the delaying instructions complete successfully, control is given to the target software. If the delaying instructions do not complete successfully, then the bootloader, BIOS, or other initially run software can retain control.

DETAILED DESCRIPTION

Before a device executes its Basic Input Output System (BIOS), non-complex processors such as microcontrollers execute their own minimal startup software and not the software that can eventually run on the device during steady-state operation. These microcontrollers execute firmware that is usually subdivided into a simple bootloader firmware and application firmware. The bootloader firmware typically gains control initially, calculates a checksum to verify the integrity of the application firmware, and then hands control over to the application firmware if the checksum matches what is expected. The application firmware handles the steady-state operation of the microcontroller in the system. The microcontrollers may or may not communicate with the processor associated with the operating system (OS). Generally, microcontrollers manage other hardware of the device system. Other processors (e.g., processors that are more complex than microcontrollers) may execute the BIOS initially in order to initialize some hardware and validate some memory contents, and may then give control to an OS that controls the processor during steady-state operation. The OS in turn may load other software such as device drivers to re-initialize and/or otherwise control hardware of the system.

As will be demonstrated herein and below, according to example embodiments of the technology disclosed herein, the firmware associated with the microcontroller for the bootloader is modified to enforce a delay. The delay provides assurance during startup or boot that the microcontrollers and processors of the device have recovered from any remaining electrical transients before the bootloader permits steady-state software to run. In an embodiment, the delays can be implemented in the BIOS associated with a more advanced processor that may run an OS. In an embodiment, the delays for ensuring the device is free of any electrical transients can be provided in bootloader firmware, application firmware, BIOS, and/or the OS. The delays and/or repetitions of critical code may be executed during processor initialization and/or during processor steady-state operation, depending on the nature of the transients and their effects on the system. For example, transients that impair processor operation but leave memory contents unaltered can be handled differently from transients that alter memory contents.

Figure 1A:
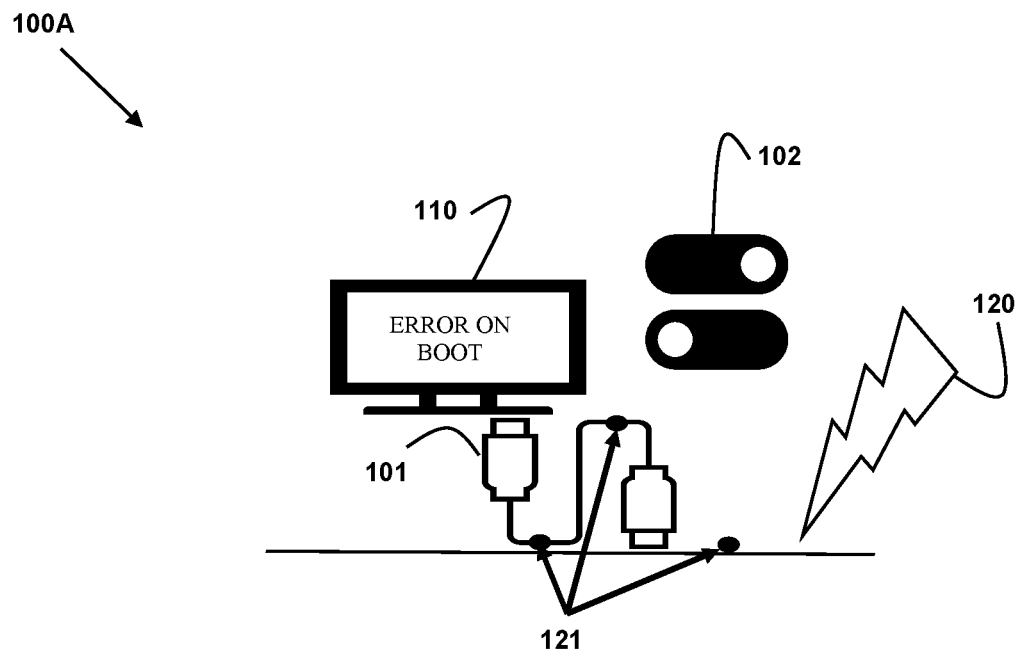
FIG. 1A is a diagram of example causes of electrical transients experienced by a device, according to an example embodiment.

FIG. 1A is a diagram of example causes of electrical transients experienced by a device, according to an example embodiment. FIG. 1A illustrates a system 100A that includes a device 110, a power cord 101, switches 102 for powering the device 110 on and off, electrical transients 121, and one potential cause of the electronic transients 121, namely lightning 120.

It is noted that lightning 120 is not required to cause electronic transients 121; rather, the transients 121 can be caused at any time the device 110 is powered on via the power-on switch 102. During operation, lightning 120 can cause the transients because a power surge or other interference over the air, cord 101, or a communication line interfaced to device 110 can cause the transients 121. Poor electrical connections, solar activity such as sunspots, and other electromagnetic noise can also cause transients of voltage and/or current.

Transients 121 may adversely impact the expected operation of the device's microcontrollers and/or other processors. As a result, unexpected results may be experienced during operation of device 110 due to the transients 121. For example, the OS image and other data in memory can be corrupted causing failure of device operation. There may be nothing wrong with the underlying firmware or software associated with the OS, rather, because of the transients the microcontrollers and/or processors may have not loaded the OS or other device-based firmware and/or configurations properly, causing malfunction.

As used herein, a "nested loop" is a loop within a loop, an inner loop within the body of an outer loop. The inner loop can itself be a nested loop. In fact, there can one or more levels of nested loops such that the number of nested levels L 1 and the total number of loops, including an outermost loop and each nested loop contained therein (at a corresponding one of the nested levels) may be N 2.

Embodiments that follow permit the device to self-mitigate any transients during power on (startup or boot), such that the device operates properly. The microcontroller/processor can self-assess its own behavior at a startup and periodically thereafter, by executing calculations and checking for a correct result. For example, the microcontroller/processor can calculate a value such as a checksum from the data in a block of memory, then compare the result of the checksum calculation to a reference result. Dependent upon the device system, the microcontroller/processor can also check the states of input lines for correctness, or at least for consistency with the microcontroller's/processor's information regarding the state of the device system. If these self-checks detect no anomalies, then the microcontroller/processor can initiate or resume execution of other firmware for functionality of the device system. Alternatively, electrical circuits can be designed to detect the occurrence of transients and latch state information indicating that a transient has occurred. A microcontroller/processor can then check the latch state to determine whether transient-mitigating processing is required.

Figure 1B:
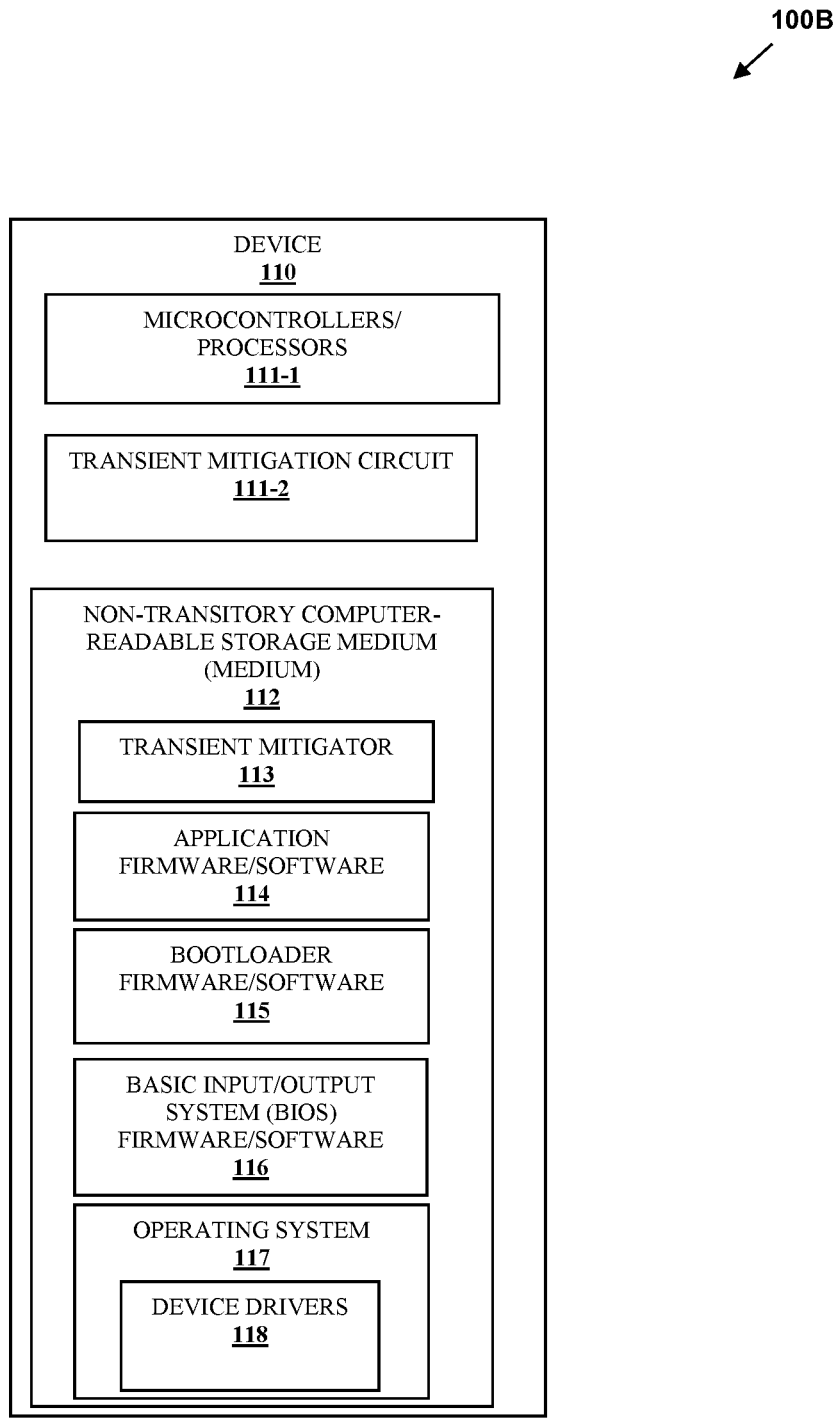
FIG. 1B is a diagram of a system for device self-mitigation of electrical transients, according to an example embodiment.

FIG. 1B is a diagram of a system 100B for device self-mitigation of electrical transients, according to an example embodiment. It is to be noted that the components are shown schematically in greatly simplified form, with only those components relevant to understanding of the embodiments being illustrated. Furthermore, the various components identified in FIG. 1B are illustrative and the arrangement of the components is presented for purposes of illustration only. It is to be noted that other arrangements with more or fewer components are possible without departing from the teachings of device self-mitigation of electrical transients, presented herein and below.

Device system 100B includes one or more microcontrollers/processors 111-1 and a non-transitory computer-readable storage medium that includes instructions for a transient mitigator 113, application firmware/software 114, bootloader firmware/software 115, BIOS firmware/software 116, OS 117, and device drivers 118. The instructions when provided to the microcontrollers/processors 111-1 cause the microcontrollers/processors 111-1 to perform operations described herein and below for 113-118. Optionally, system 100B includes a transient mitigation circuit 111-2.

The microcontroller/processor 111-1 may not be able to recover from a persistent failure, so there is an implicit assumption that the erratic behavior is transient or the result of an electric transient and that proper, steady-state operation is possible after recovery from the transient. Having detected the erratic behavior, the microcontroller/processor 111-1 needs to execute non-critical firmware or software to buy time until the device system 110 stabilizes. However, therein lies a conundrum. On the one hand, the occurrence of the erratic behavior implies that the processor/microcontroller 111-1 is operating as a nondeterministic finite automaton. On the other hand, one must assume a reasonable degree of determinism or there is no point in setting any task for the processor/microcontroller 111-1 to execute. Fortunately, erratic behavior of a processor/microcontroller 111-1 that has not been permanently damaged is often characterized by only sporadic errors. It is these sporadic errors that the device system 100 is designed to self-mitigate.

With reasonable assumptions, the processor's/microcontroller's 111-1 behavior is mostly correct during the period of instability; full stability will return within a reasonable amount of time. A technique is carefully selected for occupying the processor/microcontroller 111-1 with non-critical tasks while the device system 100B is recovering from an electrical transient. For example, one might presume that a simple timeout or sleep interval should be sufficient to keep the processor/microcontroller 111-1 idle for some amount of time, but that is a risky bet because the low-level implementation of a sleep mode is system-dependent and the processor/microcontroller 111-1 is presently known to be erratic. The processor/microcontroller 111-1 may remain in sleep mode for too much time or too little time. Similarly, using a simple loop to perform no-operations to occupy the processor/microcontroller 111-1 may fail to keep the processor/microcontroller 111-1 occupied for a desired amount of time because the erratic behavior may cause the processor/microcontroller 111-1 to exit the loop early or too late.

A more robust solution is provided herein that leverages the assumption that the processor/microcontroller 111-1 errors are sporadic. On startup, the processor/microcontroller 111-1 executes transient mitigator 113, which includes code for nested looping instructions with the innermost loop instruction executing no-op instructions and each level of looping using 8-bit loop indices to prevent any possibility of looping much longer than intended. This provides an excellent and superior way to occupy the processor/microcontroller 111-1 until the device system 100B stabilizes from transient interference. If the number of iterations for each level of looping is large and balanced, for example an outer loop of 200 iterations, a middle loop of 200 iterations, and an inner loop of 200 iterations, then a sporadic error is much more likely to affect the inner loop than the outer loop. An early exit from the inner loops is perfectly fine because the outer loop ensures that the inner loop will be entered many other times. As long as the device system 100B stabilizes within a reasonable time, any errors that would cause the number of iterations of any loop to increase are limited to 255, a reasonably small error in magnitude from which the execution will quickly recover when the device system 100B stabilizes sufficiently to satisfy the loop exit condition. In an embodiment, the number of outer and inner loops is a configurable number. In an embodiment, the number of outer loops is equal to the number of inner loops. In an embodiment, the number of outer loops is different from the number of inner loops. In an embodiment, the numbers of outer and inner loops are defined in a data field, storage, or memory accessible at run time to the firmware or software associated with the processor/microcontroller 111-1.

The nested looping instructions of the transient mitigator 113 are intended to buy sufficient time for the device system 100B to stabilize before critical instructions associated with the application firmware/software 114, the bootloader firmware/software 115, the BIOS firmware/software 116, the OS 117, and the device drivers 118 are executed. Since the duration of the instability is unpredictable, using a secondary mechanism to confirm stability can be employed and executed. In an embodiment, to do this firmware associated with the processor/microcontroller 111-1 self-assesses its own behavior again and re-executes the transient mitigator 113 (nested loop) if necessary. In a typical case, the processor/microcontroller 111-1 executes functionally useful tasks that suffice to confirm stability. As an example, the bootloader firmware/software 115 can loop several times to calculate and validate the checksum of the application firmware/software 114. If one or more iterations are successful, then stability is implied and the bootloader firmware/software 115 can transfer control to the application firmware/software 114 to execute mission-critical functionality. In an embodiment, the system can log and/or report statistics relating to transients and recovery from transients for analysis by humans and/or for adaptive improvement of the logic for recovering from transients.

Once a first set of critical startup firmware or software executes such as application firmware/software 114, a next set of critical firmware or software executes such as BIOS firmware/software 116, which validates, and loads the OS 117. OS 117 loads device drivers 118, and device system 100B is up and running without any erratic behaviors from transients.

In an embodiment, the processor 111-1 associated with validating and loading the BIOS firmware/software 116 or other target software may also execute the transient mitigator 113. In an embodiment, both the microcontroller 111-1 associated with validating and loading the bootloader firmware/software 114 and the processor 111-1 associated with validating and loading the BIOS firmware/software 116 execute the transient mitigator 113. In an embodiment, each microcontroller 111-1 and each processor 111-1 of device system 100B for device 110 may each execute the transient mitigator 113 before handing control off to additional firmware or software during a startup or boot of device 110. In fact, any critical software associated with bringing device 110 into a steady-state of operation may execute transient mitigator 113.

In an embodiment, device system 100B provides a mechanism by which non-deterministic behavior of a device 110 is mitigated until the device 110 is properly exhibiting deterministic behavior. The non-deterministic behavior is caused by an electrical transient present on a power cord 101, caused when powered on by a power on switch 102, caused via a connection to a different device, caused by a communication channel, and/or caused by external forces such as mechanical shocks or vibration, temperature changes, lightning 120, arcing, or other transients of the electromagnetic field.

Device system 100B detects processor/microcontroller 111-1 instability via built-in self tests that the processor/microcontroller 111-1 can execute at startup/boot or at other times. If processor/microcontroller 111-1 instability is detected, then nested looping instructions are executed for transient mitigator 113, the looping instructions process no-ops to buy time for device system 100B to stabilize itself from the unexpected electrical transient. As a further check, a portion of the bootloader firmware/software 115 and/or BIOS firmware/software 116 can perform a second self-check once the looping instructions exit to ensure a checksum calculation for the bootloader firmware/software 115 and/or the BIOS firmware/software 116 matches what is expected. The second self-check can exit once it is confirmed that the calculated checksum matches the expected checksum for the corresponding modules 115 and/or 116.

Furthermore, device system 100B provides increased reliability and resistance to externally induced electrical transients. Device system 100 increases the likelihood of proper device system 100B operation despite recurring and occasional instability caused by electrical transients. This results in fewer service calls, support calls, and problem reports for device 110 due to electrical transients. Device system 100B intentionally slow walks startup/boot of device 110 to allow device 100 time to self-correct during unexpected electrical transients on power lines and/or communication lines. This reduces the downtime of device 110 when electrical transients are detected.

In an embodiment, device 110 can include a single-processor architecture or a multi-processor architecture. The device 110 may have one or several microcontrollers 111-1. In an embodiment, a processor communicates with other processors in a single-device or multiple-device system to coordinate responses to transients. Thus, multiple processors can coordinate to manage the transients in a multiple-device system.

In an embodiment, system 100B includes a transient mitigation circuit 111-2. Microcontrollers 111-1 or processors 111-1 may periodically use transient mitigator 113 to check for transients at startup or during steady-state operation of device 110. When a transient is detected during steady-state operation, the steady-state operation is suspended and control is passed to transient mitigation circuit 111-2, which is designed to delay further operation of device 110 until transients have passed. Control is then passed back from microcontrollers 111-1 or processors 111-1 to the corresponding firmware or software, which may entail restarting device 110 and restoring the previous steady-state operation that was suspended.

In an embodiment, device 110 is any processor-enabled device, such as but not limited to, transaction terminals (for example, automated teller machines (ATMs), self-service terminals (SSTs), point-of-sale (POS) terminals, travel kiosks, media kiosks, servers, laptops, phones, wearable processing devices, and Internet-Of-Things (IOT) devices).

Figure 2A:
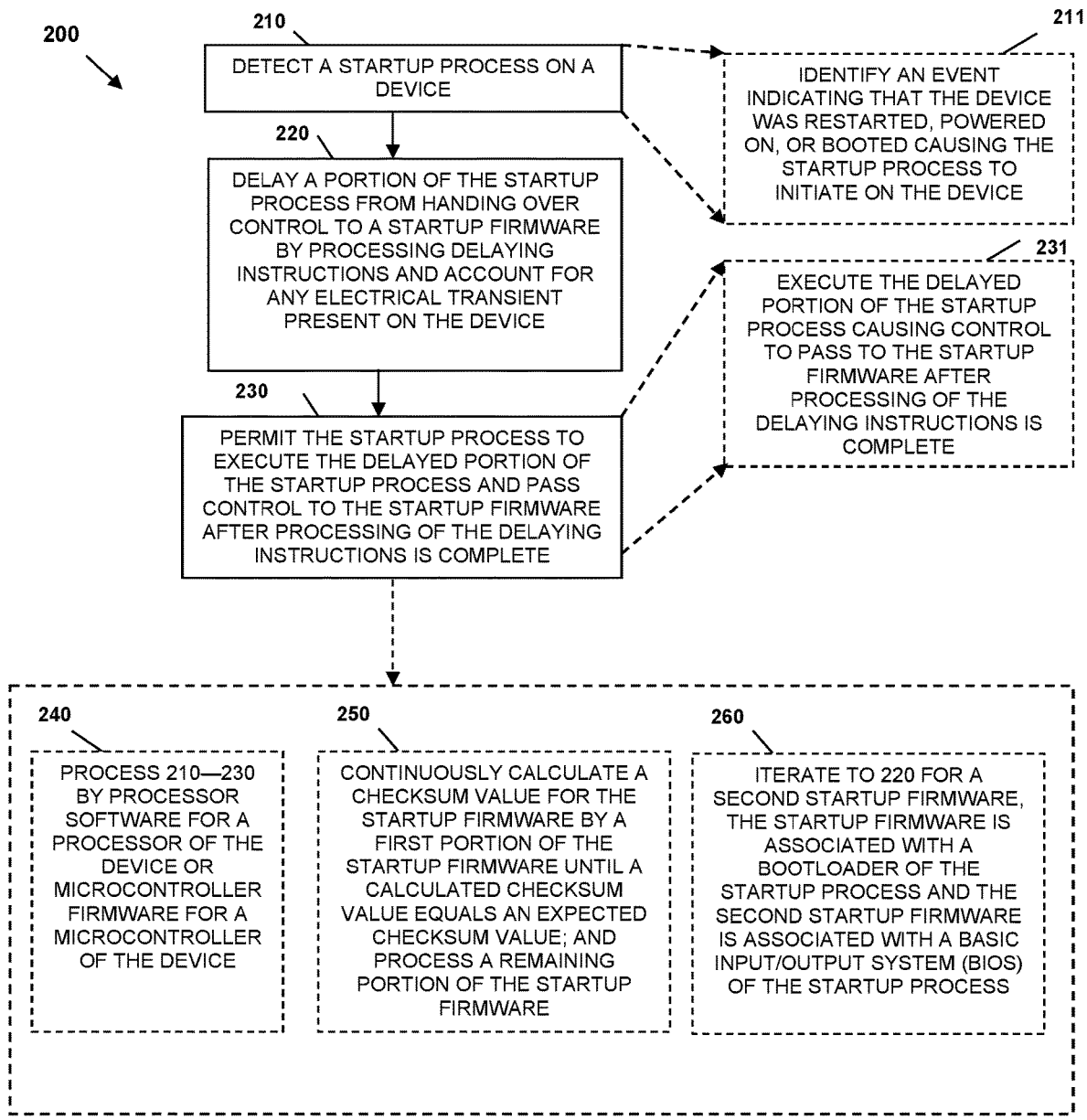
FIG. 2A is a flow diagram of a method for device self-mitigation of electrical transients, according to an example embodiment.
Figure 2B:
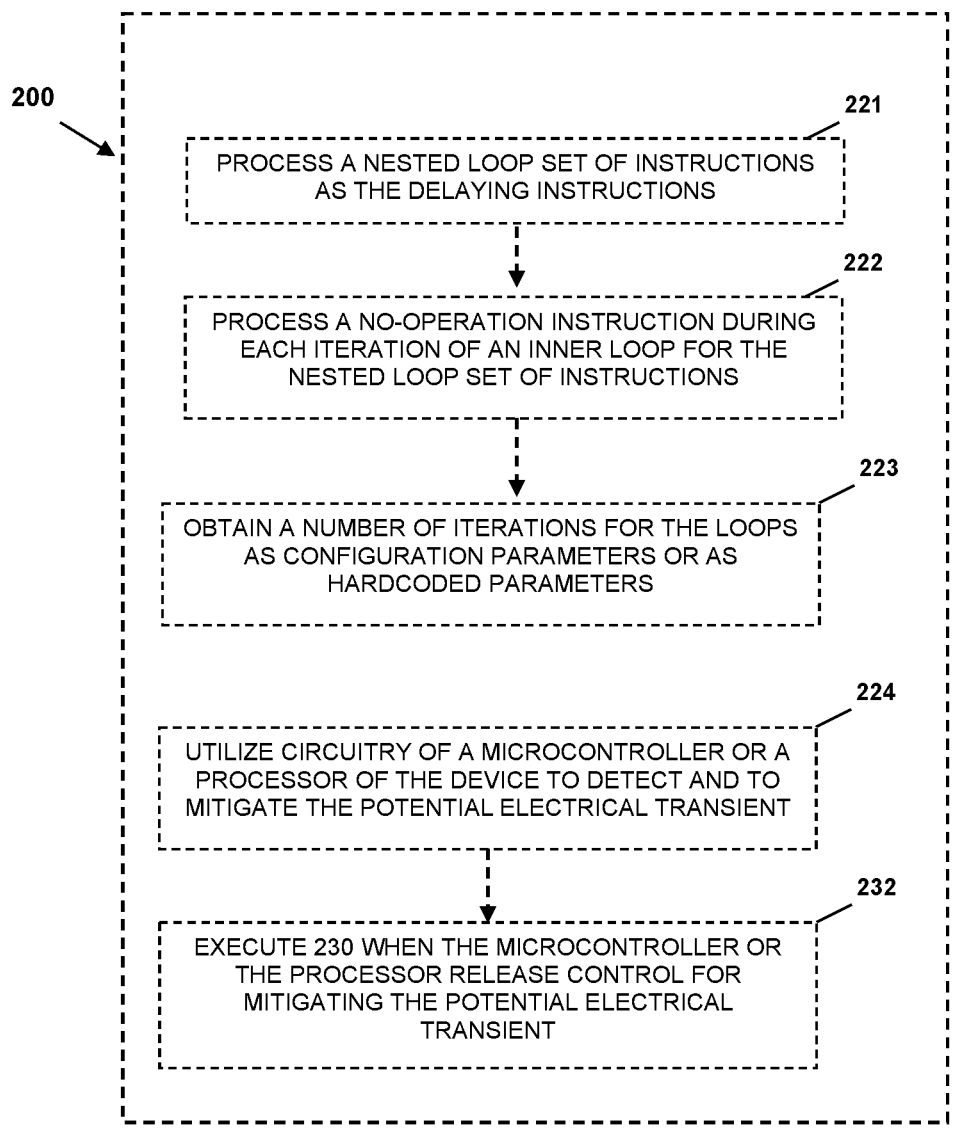
FIG. 2B is a flow diagram of embodiments of the method of FIG. 2A.
Figure 2C:
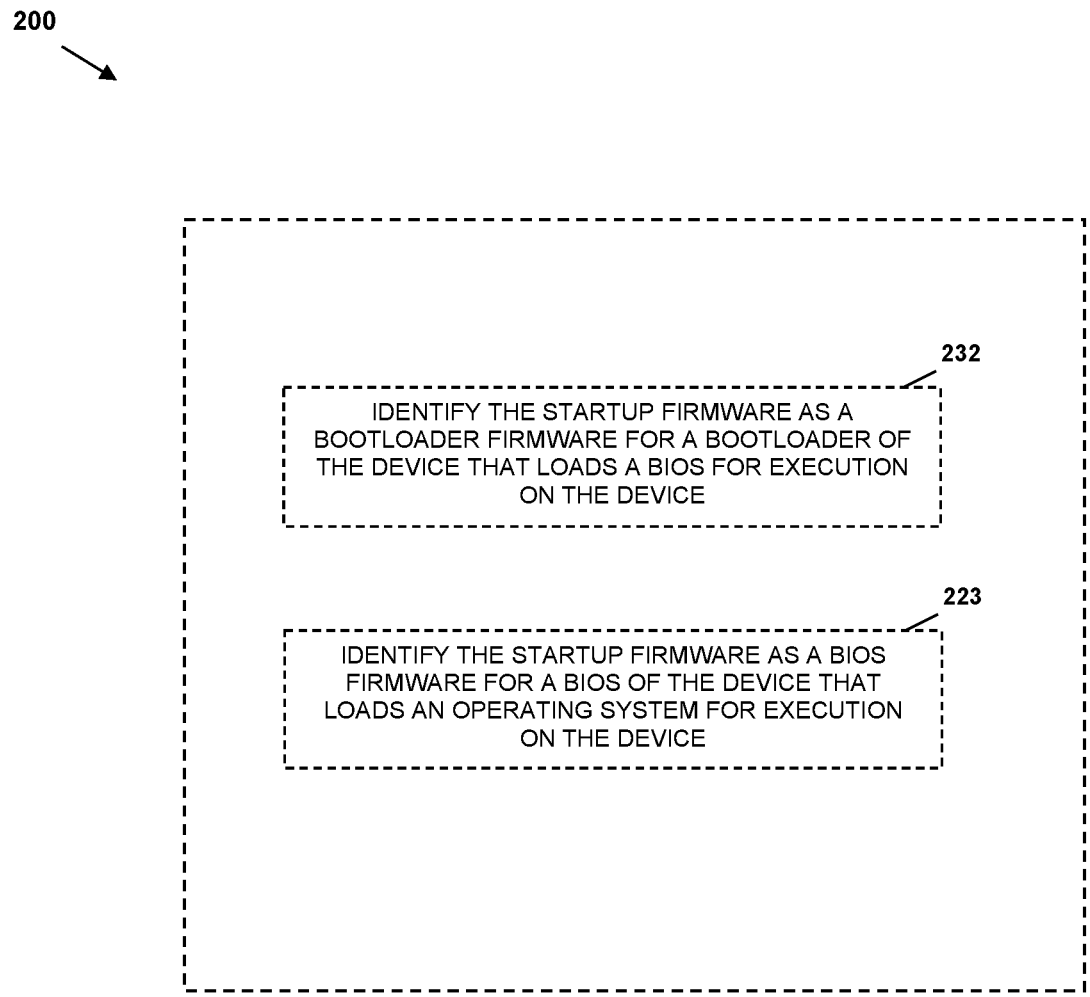
FIG. 2C is a flow diagram of additional embodiments of the method of FIG. 2A.

The above-referenced embodiments and other embodiments are now discussed with reference to FIGS. 2A, 2B, 2C, and 3. FIGS. 2A, 2B, and 2C are diagrams of a method 200 for device self-mitigation of electrical transients, according to an example embodiment. The software module(s) that implements the method 200 is referred to as a "device transient self-mitigation manager." The device transient self-mitigation manager is implemented as executable instructions programmed and residing within memory and/or a non-transitory computer-readable (processor-readable) storage medium and executed by one or more processors of a device or set of devices. The processor(s) of the device(s) that executes the device transient self-mitigation manager are specifically configured and programmed to process the device transient self-mitigation manager. The device transient self-mitigation manager may or may not have access to one or more network connections during its processing. The network connections can be wired, wireless, or a combination of wired and wireless.

In an embodiment, the device transient self-mitigation manager executes on device 110. In an embodiment, the device 120 is an SST, a POS terminal, an ATM, a kiosk, a server, a desktop computer, a tablet, a wearable processing device, a phone, or an IoT device.

In an embodiment, device transient self-mitigation manager is one, all, or some combination of 113, 114, 115, 116, 117, and/or 118. In an embodiment, device transient self-mitigation manager presents another, and in some ways, an enhanced processing perspective from that which was discussed above for device 110 of device system 100B.

At 210 (shown in FIG. 2A), device transient self-mitigation manager detects a startup process on a device 110. In an embodiment, at 211, the device transient self-mitigation manager identifies an event indicating that the device 110 was restarted, powered on, or booted causing the startup process to initiate on the device 110.

At 220 (shown in FIG. 2A), device transient self-mitigation manager delays a portion of the startup process from handing over processing control to a startup firmware by processing delaying instructions. This is to account for any potential electrical transient present on the device 110.

In an embodiment, at 221 (shown in FIG. 2B), device transient self-mitigation manager processes a nested loop set of instructions as delaying instructions for purposes of allowing any potential transient to resolve itself before the startup firmware is processed. In an embodiment of 221 and at 222 (shown in FIG. 2B), device transient self-mitigation manager processes a no-operation instruction during each iteration of an inner loop for the nested loop set of instructions. In an embodiment of 222 and at 223 (shown in FIG. 2B), device transient self-mitigation manager obtains a number of iterations for the loops as a configuration parameters or as parameters hardcoded. In an embodiment, a single configuration parameter identifies the number of loops for both the inner and outer loops. In an embodiment, a first configuration parameter identifies the number of loops for the inner loops while a second configuration parameter identifies the number for the outer loops. In an embodiment, at 224 (shown in FIG. 2B), a microcontroller/processor itself may incorporate circuitry to detect and/or mitigate potential electrical transients, possibly before handing or returning control to a bootloader, to an application in firmware, to a BIOS, or to an OS.

At 230 (shown in FIG. 2A), device transient self-mitigation manager permits the startup process to execute the portion and pass control to the startup firmware after the delaying instructions completed. That is, when the delaying instructions have finished executing control is given back to the startup process to pass control to the startup firmware.

In an embodiment, at 231 (shown in FIG. 2A), device transient self-mitigation manager executes the portion of the startup process causing control to pass to the startup firmware after the delaying instructions complete. That is, a microcontroller 111-1 or a processor 111-1 executes or obtains and then executes the startup firmware after the delaying instructions complete providing control of the startup process to the startup firmware.

In an embodiment of 224 and 230, at 232 (shown in FIG. 2B), device transient self-mitigation manager executes 230 when the microcontroller or the processor releases control for mitigating the potential electrical transient. So, the specialized circuit can mitigate the transient and when it completes and releases control, the device transient self-mitigation manager resumes its processing at 230 by permitting the startup process to execute the portion and then passing control to the startup firmware. The specialized circuit performs the delaying as identified in the embodiment of 224 above.

In an embodiment, at 232 (shown in FIG. 2C), device transient self-mitigation manager identifies the startup firmware/software as a bootloader firmware/software 115 for a bootloader of the device 110 that loads BIOS firmware/software for execution on the device 110. In an embodiment, at 233 (shown in FIG. 2C), device transient self-mitigation manager identifies the startup firmware/software as a BIOS firmware/software 116 for the device 110 which loads an OS 117 on the device 110.

In an embodiment, at 240 (shown in FIG. 2A), the device transient self-mitigation manager is processed as processor software for a processor 111-1 of the device 110 or is processed as microcontroller firmware for a microcontroller 111-1 of the device 110. That is, processing of 210-230 is executed as firmware or software associated with a processor 111-1 or a microcontroller 111-1 of device 110.

In an embodiment, at 250 (shown in FIG. 2A), device transient self-mitigation manager continuously calculates a checksum value for the startup firmware by a first portion of the startup firmware until a calculated checksum value equals an expected checksum value. The device transient self-mitigation manager processes a remaining portion of the startup firmware after the calculated checksum value equals the expected checksum value. In an embodiment, a processor or microcontroller continuously executes a background task performing a checksum calculation or other operations for the purposes of detecting whether a transient has occurred; if a transient is detected, then a recovery sequence is initiated.

In an embodiment, at 260 (shown in FIG. 2A), device transient self-mitigation manager iterates back to 220 for a second startup firmware/target software. The startup firmware/target software is associated with a bootloader of the startup process and the second startup firmware/target software is associated with a BIOS of the startup process. This is a case where both the bootloader and the BIOS are intentionally delayed to optimally ensure that there are no electrical transients present on the device 110 during the startup process.

Figure 3:
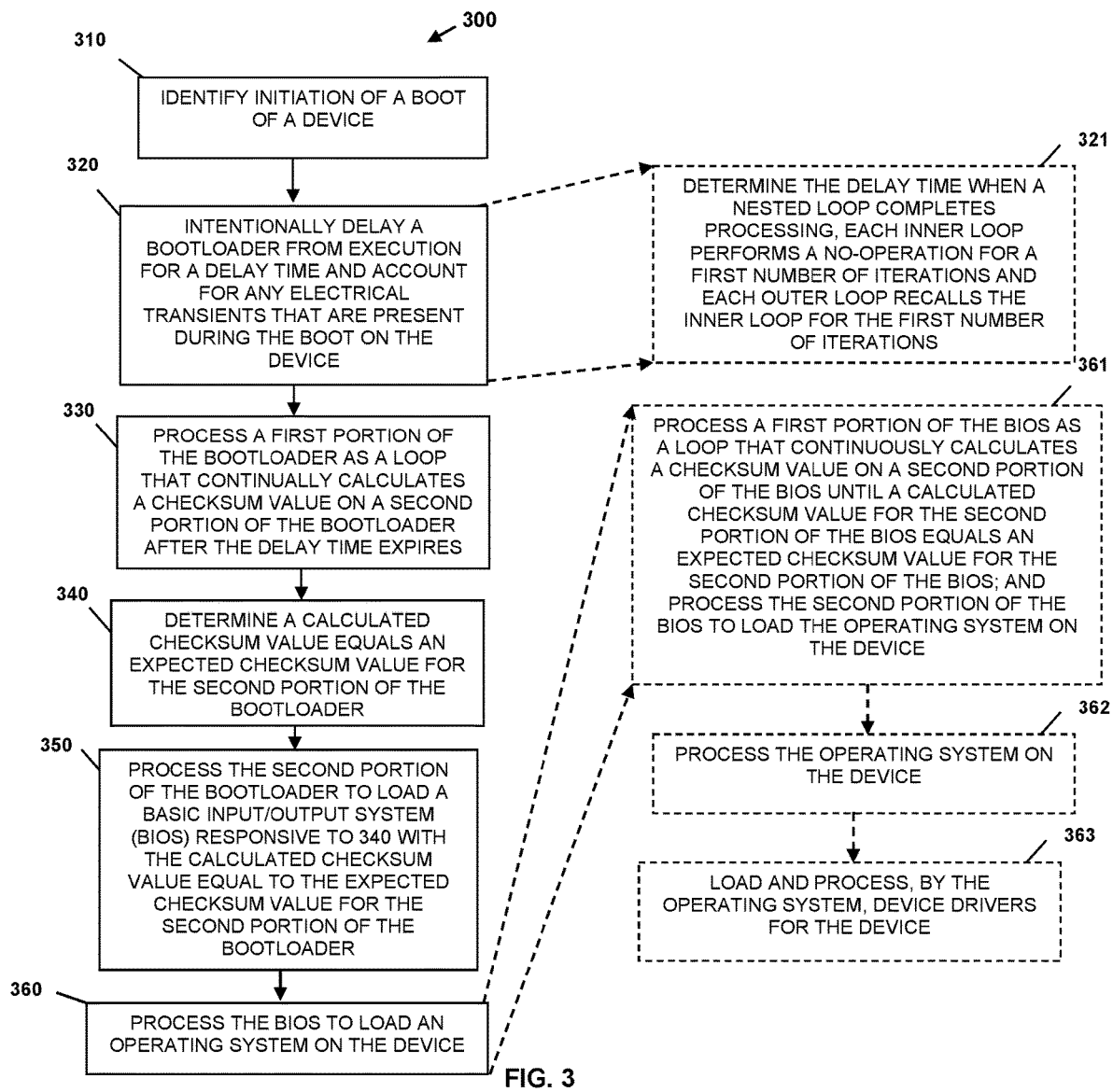
FIG. 3 is a flow diagram of another method for device self-mitigation of electrical transients, according to an example embodiment.

FIG. 3 is a diagram of a method 300 for device self-mitigation of electrical transients, according to an example embodiment. The software module(s) that implements the method 300 is referred to as an "electrical transient mitigation manager." The electrical transient mitigation manager is implemented as executable instructions programmed and residing within memory and/or a non-transitory computer-readable (processor-readable) storage medium and executed by one or more processors of a device or set of devices. The processor(s) of the device that executes the electrical transient mitigation manager are specifically configured and programmed to process the electrical transient mitigation manager. The electrical transient mitigation manager may or may not have access to one or more network connections during its processing. The network connections can be wired, wireless, or a combination of wired and wireless.

In an embodiment, the device that executes electrical transient mitigation manager is device 110. In an embodiment, the device 110 is an ATM, a POS terminal, an SST, a kiosk, a phone, a tablet, a laptop, a desktop computer, a wearable processing device, or an IoT device.

In an embodiment, the electrical transient mitigation manager is all of, or some combination of, 113, 114, 115, 116, 117, 118, and/or method 200. The electrical transient mitigation manager presents another and, in some ways, an enhanced processing perspective from that which was described above for device system 100B and method 200.

At 310 electrical transient mitigation manager identifies initiation of a boot of a device. The boot can occur based on any number of events, such as a user-requested restart of device 110, a power failure with automatic power returning, powering on the device 110 after the device had been powered off, etc.

At 320, electrical transient mitigation manager intentionally delays a bootloader from execution for a delay time to optimally account for any potential electrical transients that may have been present during the boot on the device 110. That is, the delay time is optimally ensured through execution of instructions that delay the boot while the instructions are no-operations.

In an embodiment, at 321, electrical transient mitigation manager determines the delay time when a nested loop completes processing. Each inner loop of the nested loop performs a no-operation for a first number of iterations and each outer loop of the nested loop executes the inner loop of the nested loop for the second number of iterations.

At 330, electrical transient mitigation manager processes a first portion of the bootloader as a loop that continually calculates a checksum value on a second portion of the bootloader after the delay time expires. This ensures that should any transient remain it is safe to proceed because the checksum for the bootloader is confirmed as being accurate.

At 340, the electrical transient mitigation manager determines that a calculated checksum value equals an expected checksum value for the second portion of the bootloader. This is an indication that any transient has cleared and evidence through the checksum comparison indicates that the device is in a proper state to boot to the steady-state of operation.

At 350, electrical transient mitigation manager processes the second portion of the bootloader to load a BIOS responsive to 340 with the calculated checksum value equal to the expected checksum value for the second portion of the bootloader. This is confirmation that the device 110 is acting as it should and deterministically and that the bootloader code is authentic.

At 360, the electrical transient mitigation manager processes the BIOS to load an operating system on the device 110. The boot is now mostly complete.

In an embodiment, at 361, electrical transient mitigation manager processes a first portion of the BIOS as a loop that continuously calculates a checksum value on a second portion of the BIOS. This continues until a calculated checksum value for the second portion of the BIOS equals an expected checksum value for the second portion of the BIOS. The electrical transient mitigation manager processes the second portion of the BIOS to load the operating system on the device 110. In an embodiment, at 362, electrical transient mitigation manager processes the operating system on the device 110. In an embodiment, at 363, the operating system loads and processes device drivers for the device 110; at this point the boot is substantially finished and the device is operational, free of any potential electrical transients.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner. The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:
1. A method, comprising:
detecting a startup process on a device;
delaying a portion of the startup process from handing over control to a startup firmware by processing delaying instructions and accounting for any electrical transient present on the device;
permitting the startup process to execute the delayed portion of the startup process, wherein the startup process passes control to the startup firmware after the processing of the delaying instructions is complete; and
iterating to the delaying for a second startup firmware, wherein the startup firmware is associated with a bootloader of the startup process and the second startup firmware is associated with a Basic Input/Output System (BIOS) of the startup process.

2. The method of claim 1 further comprising:
processing the detecting, the delaying, and the permitting by processor software for a processor of the device or microcontroller firmware for a microcontroller of the device.

3. The method of claim 1 further comprising:
continuously calculating a checksum value for the startup firmware by a first portion of the startup firmware until a calculated checksum value for the startup firmware equals an expected checksum value; and
processing a second portion of the startup firmware.

4. The method of claim 1, wherein detecting further includes identifying an event indicating that the device was restarted, powered on, or booted causing the startup process to initiate on the device.

5. The method of claim 1, wherein delaying further includes processing a nested loop set of instructions as the delaying instructions.

6. The method of claim 5, wherein processing further includes processing a no-operation instruction during each iteration of an inner loop for the nested loop set of instructions.

7. The method of claim 6, wherein processing further includes obtaining a number of iterations for each loop as configuration parameters or as parameters that are hard-coded.

8. The method of claim 1, wherein delaying further includes utilizing circuitry of a microcontroller or a processor of the device to detect and to mitigate an electrical transient.

9. The method of claim 8, wherein permitting further includes processing the permitting when the microcontroller or the processor releases control.

10. The method of claim 1, wherein permitting further includes executing the portion associated with the startup process causing control to pass to the startup firmware after the delaying instructions complete.

11. A method, comprising:
detecting a startup process on a device;
delaying a portion of the startup process from handing over control to a startup firmware by processing delaying instructions and accounting for any electrical transient present on the device; and
permitting the startup process to execute the delayed portion of the startup process, wherein the startup process passes control to the startup firmware after the processing of the delaying instructions is complete, wherein permitting further includes identifying the startup firmware as a bootloader firmware for a bootloader of the device that loads a Basic Input/Output System (BIOS) for execution on the device.

12. A method, comprising:
detecting a startup process on a device;
delaying a portion of the startup process from handing over control to a startup firmware by processing delaying instructions and accounting for any electrical transient present on the device; and
permitting the startup process to execute the delayed portion of the startup process, wherein the startup process passes control to the startup firmware after the processing of the delaying instructions is complete, wherein permitting further includes identifying the startup firmware as a Basic Input/Output System (BIOS) firmware for a BIOS of the device that loads an operating system for execution on the device.

13. A method, comprising:
identifying initiation of a boot of a device;
intentionally delaying a bootloader from execution for a delay time and accounting for any electrical transients that are present during the boot on the device;
processing a first portion of the bootloader as a loop that continuously calculates a checksum value on a second portion of the bootloader after the delay time expires;
determining that the calculated checksum value equals an expected checksum value for the second portion of the bootloader;
processing the second portion of the bootloader to load a Basic Input/Output System (BIOS) responsive to determining that the calculated checksum value equals the expected checksum value for the second portion of the bootloader; and
processing the BIOS to load an operating system on the device.

14. The method of claim 13, wherein intentionally delaying further includes determining the delay time when a nested loop completes processing, wherein each inner loop of the nested loop performs a no-operation for a first number of iterations and each outer loop of the nest loop executes the inner loop for the first number of iterations.

15. The method of claim 13, wherein processing the BIOS further includes:
processing a first portion of the BIOS as a loop that continuously calculates a checksum value on a second portion of the BIOS until a calculated checksum value for the second portion equals an expected checksum value for the second portion of the BIOS; and
processing the second portion of the BIOS to load the operating system on the device.

16. The method of claim 15, wherein processing the first portion of the BIOS further includes processing the operating system on the device.

17. The method of claim 16, wherein processing the operating system further includes loading and processing, by the operating system, device drivers for the device.

* * * * *